Sept. 12, 1961  G. A. CAMPBELL  2,999,797
INDICATING AND CONTROL SYSTEM RESPONSIVE TO DEMAND
Filed April 4, 1957  3 Sheets-Sheet 1
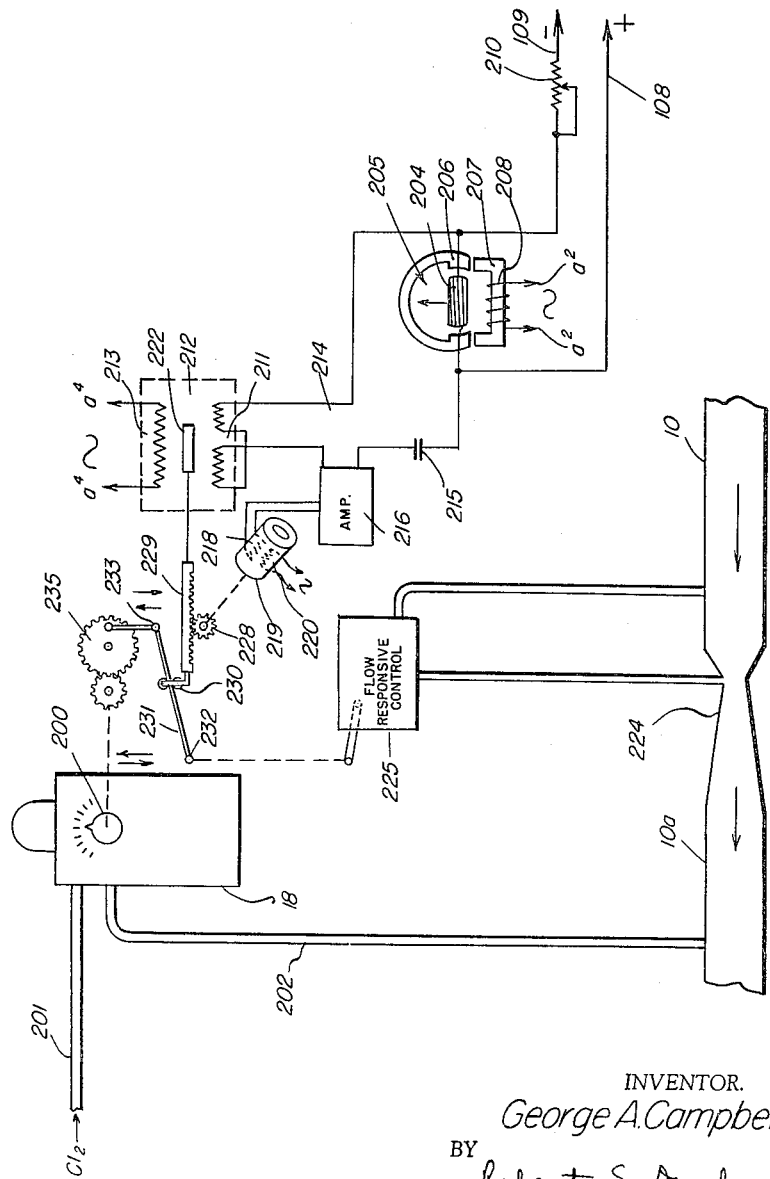
FIG. 1-A
INVENTOR.
George A. Campbell
BY Robert S. Dunham
Attorney Sept. 12, 1961 G. A. CAMPBELL 2,999,797
INDICATING AND CONTROL SYSTEM RESPONSIVE TO DEMAND
Filed April 4, 1957 3 Sheets-Sheet 2

FIG.1-B

INVENTOR.
George A. Campbell
BY Robert S. Dunham
Attorney

Sept. 12, 1961  G. A. CAMPBELL  2,999,797
INDICATING AND CONTROL SYSTEM RESPONSIVE TO DEMAND
Filed April 4, 1957  3 Sheets-Sheet 3
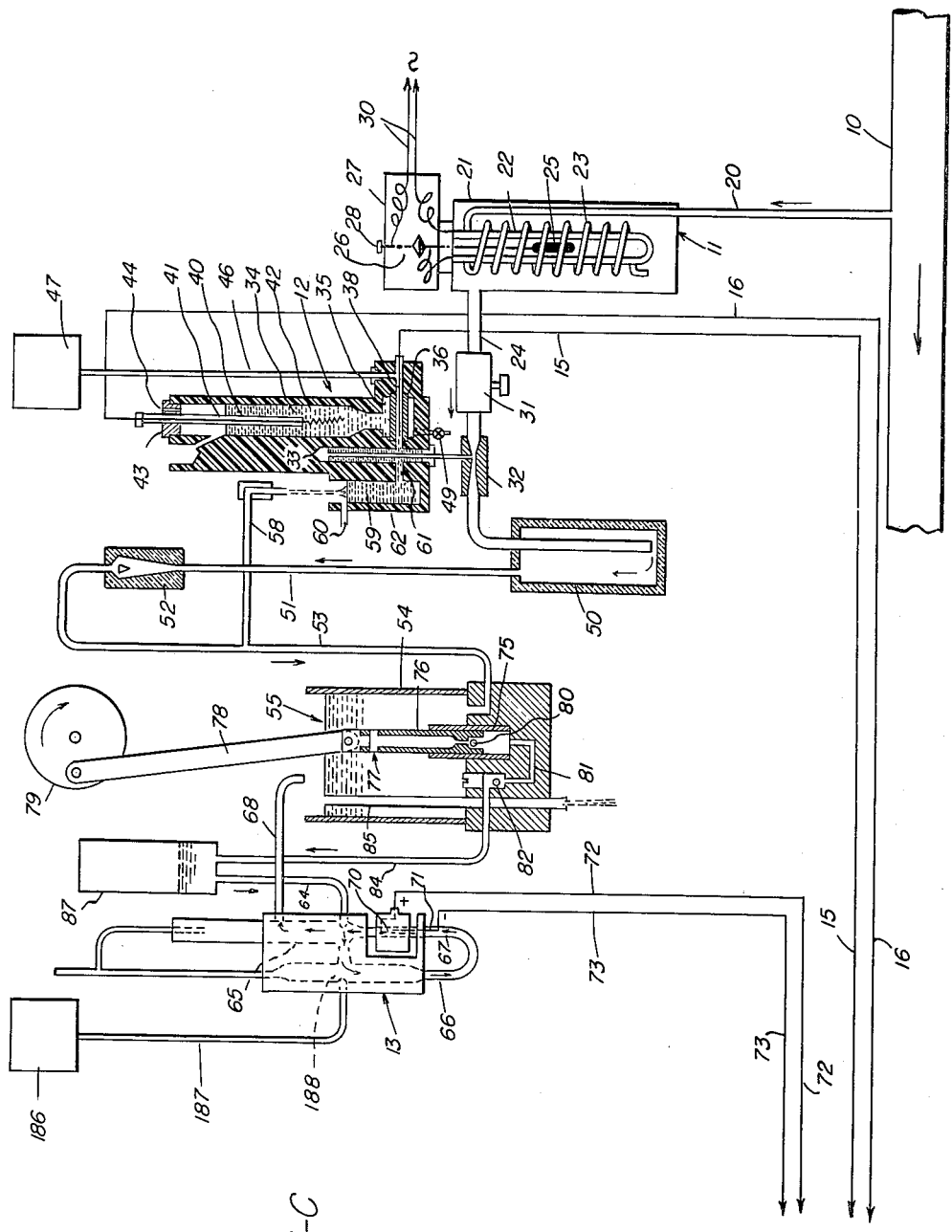
FIG 1-C
INVENTOR.
George A. Campbell
BY
Robert S. Dunham
Attorney

United States Patent Office 2,999,797
Patented Sept. 12, 1961

2,999,797
INDICATING AND CONTROL SYSTEM
RESPONSIVE TO DEMAND
George A. Campbell, Pompton Plains, N.J., assignor to Wallace & Tiernan Inc., a corporation of Delaware
Filed Apr. 4, 1957, Ser. No. 650,768
7 Claims. (Cl. 204—1)

This invention relates to apparatus and procedure for indication or control in automatic response to the demand of a material for treatment. In a more particular sense, the invention is related to means and methods for automatically determining the demand of an aqueous liquid, such as water, sewage or the like, for chlorination, to provide control or indication of the dosage of chlorine required for a predetermined result.

In systems for the treatment of flowing liquid with chlorine, it is desirable for insuring completeness of treatment, for avoiding over-chlorination, and for economy of chlorine, that the treatment follow changes in demand as well as changes in flow. Conventionally in many cases the desired result is that after appropriate time for reaction of the chlorine with organisms and other contamination, a so-called residual chlorine content will remain in the liquid. Depending on circumstances, the desired residual may vary from about 1 p.p.m. (part per million) of chlorine, or even in some cases as low as about 0.1 p.p.m., up to 5 or 10 p.p.m. or perhaps higher. Quite ordinarily, for a given result, chlorinating equipment is automatically adjusted in response to changes of rate of flow of the aqueous liquid under treatment, and effort is sometimes also made to adjust the dosage in accordance with changes in demand of the liquid for chlorine, e.g. due to change in the extent of contamination.

An important object of the present invention is to provide automatic and essentially continuous detection of the demand of aqueous liquid for chlorine treatment, in a new and improved manner, appropriate for automatic control of the chlorinating operation. In a more particular sense, an object is to afford automatic means, directly responsive to a sampling or other test of the untreated liquid, for determining its chlorine dosage demand, and for thereby controlling the feed of chlorine to the main flow or other body of liquid.

More specific objects include the provision of unusually rapid and reliable sensing of the demand for treatment, and the provision of arrangements obviating a need to rely on test of the main flow or stream after it has been chlorinated, as a guide for adjustment of the treatment.

A troublesome factor in attempts to control chlorination by test of the main flow after treatment, is the time interval for the desired action of the chlorine in reducing contamination to a desired point of safety, for example to the point of a predetermined residual chlorine content. This reaction time varies with the temperature of the water, and in a given installation, the rate of water flow and especially variations in such rate also cause difficulty in selecting a locality for test sampling downstream of the place of chlorination. Hence the sampling point may not be determinable as the same for all conditions, and in order to achieve a safe approximation of completed reaction may have to be located so far downstream as to be inconvenient for installation of test equipment. In such cases the large time interval for reaction and the corresponding delay in control may require over-chlorination in order to guard against a rapid change in demand.

A chief aim of the invention is therefore to obviate or minimize difficulties of this sort, in a new and effective way. Other important objects are the provision of improved means for determining demand of a liquid for chlorination, and improved means for translating the results of test chlorination of a sample flow into a reading, record or control signal representative of demand.

To these and other ends, the present invention involves the withdrawal of a small and preferably continuous sample of the untreated liquid, i.e., continuously successive quantities of such liquid, and the subjection of the sample to the desired treatment, e.g., chlorination. The treated sample, after appropriate retention for completion of reaction (preferably within a short, uniform time as explained below) is tested to determine the results, for example whether and to what extent it contains residual chlorine. An additional feature of invention is the use of chlorine generation by electrolytic action, for sample treatment in the demand-detecting system, whereby the rate of chlorination, is determinable by the electric current flow.

Means are further provided whereby the test of the treated sample, e.g., for residual chlorine, is utilized to control the supply of electrical energy to the electrolytic generating cell, a further specific feature being an arrangement such that the application of corrective change (to the electrolytic chlorine generator) is effected periodically by null-balance means. The condition of the treated sample as detected preferably by an electrolytic cell is read, so to speak, at periodic intervals in measurement against a standard condition or signal. In accordance with the direction and extent of error, adjustment is then immediately effected, e.g., in the current flow through the chlorine generating cell, to bring the control instrumentalities to balance at or toward a point where the actual error is reduced to zero.

Under control of these instrumentalities, the complete system embraces means and procedure whereby a periodically corrected indication of the demand of the liquid is produced, and also whereby the dosage rate of a treating instrumentality, such as a chlorinator, is automatically adjusted in direct accordance with changes in the rate of chlorination of the sample. Thus treatment of the main flow is properly and accurately controlled to achieve desired results, such as the predetermined residual, by adjusting the dosage to accord with changes of demand. These control instrumentalities are, in preferred systems, coordinated with means for adjusting the chlorinator rate in response to flow variations, whereby the net effect is a reliable maintenance of desired chlorine treatment with proper account for all variables.

An additional feature of special value in the invention, is the automatic maintenance of the withdrawn sample, i.e. the continuous sample flow, at a predetermined elevated temperature, so that it is characterized by such temperature during treatment with chlorine, during the subsequent reaction and preferably during the test for residual concentration. In this manner, the reaction time can be made very short and can be kept constant regardless of wide variations in the temperature of the untreated water. That is to say, the reaction time to permit significant elimination of contamination varies in an inverse manner with temperature, and for most reliable and economical control of the main chlorination, the reaction time in the test sample should be short as well as constant. It will also become apparent that in the improved systems of the invention, desirable and effective coordination is obtained between the retention time of the sample and the dwell time, which is the interval between successive functionings of the error-correcting instrumentalities.

By way of illustration of a suitable embodiment of the invention, the accompanying drawings show one form of a demand-controlled automatic dosage control system.

Referring to the drawings:

FIGS. 1A, 1B and 1C collectively illustrate the complete system in a schematic manner, including means for automatic adjustment of a main chlorinator or the like in response to changes of demand and flow in the water or other liquid; FIGS. 1C and 1B particularly illustrating a combination of instrumentalities for sensing demand by treating a sample flow, wherein the detecting means provides periodic error correction in the treatment of the sample flow.

Referring first to FIG. 1C, it will be assumed that water flowing in the main 10 is to be tested for its chlorine demand. A small sample flow is continuously withdrawn, conveniently under its own head, through a thermostatically controlled heater 11 and past an electrolytic chlorine generator 12, for eventual test by electric cell means 13. The current or signal from the cell means 13 is compared with a standard set to represent a desired residual chlorine concentration, and errors or departures from such standard are periodically utilized, in the instrumentalities of FIG. 1B, to correct the flow of chlorine-generating current supplied to the generating cell 12 through the conductors 15, 16. The current flow in the circuit of the chlorine generator, which may provide a direct indication of chlorine demand, as by the ammeter 17, is conveniently utilized for control of a treating means such as the chlorinator 18 (FIG. 1A) that supplies chlorine to the water at a downstream locality 10a of the main 10. Digrammatic illustration of means for accomplishing such control are shown in FIG. 1A, although it will be understood that any of a variety of devices may be employed for this purpose, if suitably responsive to an electrical signal such as supplied in the circuit of the chlorine generator 12, for example across the ammeter 17.

Referring further to FIG. 1C, the continuous flow of sample, i.e. of the raw or untreated liquid, travels the pipe 20 to the heater or heat exchanger 11. A variety of suitable means for automatically elevating the flowing sample to a predetermined, constant temperature may be employed. By way of example, the device 11 comprises a small tank 21 into which an electrical heating element 22, of U-shape, depends. The sample pipe 20 extends into the tank, continuing as a coil 23 around the element 22 and discharging the liquid into the lower part of the tank, from which it then continuously discharges at the top, through an outlet passage 24. A suitable thermostatic control device 25 also depends in the tank 11, conveniently within the coil 23, and is arranged for automatic response, as by closing a pair of contacts 26 in the electrical connection box 27 when the temperature drops below a predetermined value, e.g. as adjusted by a control knob 28 for varying the position of one contact. Heating current is supplied through conductors 30, so that the exchanger 11 by the thermostatic control of the device 25 and its contacts 26, maintains a desired elevated temperature in the sample delivered to the discharge passage 24; for example, for operation with water of a municipal water system, a suitably elevated temperature is 100° F.

From the passage 24, the sample water traverses a flow regulating valve 31, e.g. of a conventional type providing constant pressure at its outlet, such valve being set to provide flow at a uniform, constant value. Thence the sample flow goes through an injector 32 which aspirates chlorine, salt solution and make-up water from a suction chamber 33 in the electrolytic chlorine generator 12.

The generator 12, made of suitably chlorine-resistant plastic or like material (preferably transparent), comprises a vessel 34 for salt (sodium chloride) solution, opening at its lower part into a chamber 35 in which is disposed a horizontal, cylindrical tube 36 made of porous inert material, such as unglazed porcelain, and sealed in the walls of the chamber 35 so as to provide a porous diaphragm between the outside and inside of the tube. The tube communicates at one end with the suction chamber 33 and contains a chlorine electrode 38, for example consisting of a straight length of platinum wire (0.04 inch in diameter) mounted to extend along the center of the tube.

Through a glass support tube 40 a connection 41 extends downwardly to the other electrode 42, e.g., a coil of platinum wire, thus mounted by the tube 40 within the salt solution of the vessel 34. This support tube 40 projects upwardly from the vessel through a cap 43 which has a vent 44 for escape of gas, i.e. hydrogen, generated at the electrode 42.

Aqueous salt solution (NaCl), which is electrolyzed to generate chlorine and which may have a concentration, for example, of 50% of saturation, is supplied to the tube 36 through a pipe 46 by a pump 47, from an appropriate reservoir, not shown. This salt solution, under the suction of the injector 32, flows through the interior of the pourous diaphragm tube 36 and into the chamber 33, from which it is drawn into the sample stream by the injector. With the vessel 34 and the chamber 35 around the tube 36 likewise filled with salt solution, the connection of a source of direct current to the electrodes 38, 42, making the electrode 38 positive with respect to the electrode 42, will cause chlorine to be generated at the electrode 38 and hydrogen to be produced at the electrode 42. The porous diaphragm 36 permits flow of current for electrolysis but prevents ready mixing of the solutions adjacent the two electrodes and particularly prevents any loss (as by recombination) of the liberated chlorine. A fresh salt solution at all times flows past the chlorine electrode 38, and is not contaminated or diluted by the products of electrolysis in the vessel 34. The chlorine gas evolved at the electrode 38 is carried with the salt solution to the sample flow traversing the injector 32.

The result of electrolysis in the chamber 34 is the formation of caustic soda (NaOH), with the evolution of hydrogen gas. At infrequent intervals, it is desirable to drain the caustic solution from chamber 34, as through the drain valve 49 at the bottom of the chamber 35, and refill the vessel with fresh salt solution.

After being thus chlorinated at the injector 32 the sample flow of water travels to the bottom of a retention chamber 50, and leaves the latter at the top, thence traversing a pipe 51, a rotameter 52 or other flow measuring device and a further pipe 53, to the reservoir 54 of a pump generally designated 55.

For adequate generation of chlorine, the quantity of salt solution required to pass through the tube 36 and into the injector 32 is but a very small percentage of the sample water flow into which such solution, with its produced chlorine, is thus introduced. For example, in the situation of apparatus suitable for use with many water supply systems and providing a maximum capacity of chlorination (by the cell 12) of 5 p.p.m., the water sample flow can advantageously be 440 milliliters per minute. Under these circumstances a salt flow, i.e. constituting a 50% saturated NaCl solution, of 0.2 ml. per minute is sufficient. Hence the salt flow represents only $\frac{1}{2200}$ of the sample. In a controller arrangement providing higher dosage capacity, this last ratio may vary downward, for instance in that to provide a range up to a maximum of 10 p.p.m. chlorine as supplied by the generating cell, the sample flow may be reduced to 220 ml. per minute, with the salt flow remaining at 0.2 ml. per minute. In such case the ratio of salt to sample is $\frac{1}{1100}$, still insignificant.

Since the suction or pull of the injector 32 may vary, as when the rate of sample flow is changed for any reason, or indeed simply because of the nature of injector devices, it is necessary to supply make-up water to the suction chamber 33. That is to say, the flow of salt solution is conveniently kept constant and the injector pull (particularly to allow for both intended and non-intended changes therein) is designed to be at least a little more, at all times, than is fully accommodated by the salt solution. The necessary make-up water is supplied to a pipe 58 from the sample flow pipe 53, after the sample has left the retention chamber and has traversed the rotameter 52. The make-up water falls into an open supplemental chamber 59 having an overflow 60 and communicating at a lower part, through the port 61, with the suction chamber 33. The injector 32 draws liquid from the interior of the suction chamber 33 through an upright overflow tube 62 that provides a suction chamber level somewhat higher, say by ¼ inch, than the level maintained by the overflow 60 in the chamber 59. The space above the liquid in the chamber 33 is thus kept at a subatmospheric pressure. The amount of make-up water required is very small, for example less than 1% of the sample flow, so that no practical error results from this mode of adding it.

With the described generator it is possible to realize a current efficiency of essentially 100% in the generation of chlorine. That is to say, in accordance with Faraday's laws of electrolysis, 1 gram atomic weight of chlorine (35.46 gm.) will be liberated at the chlorine electrode by the passage of 96,500 coulombs (ampere-seconds) of electricity. In proportion, this result is the same as the liberation of 1 mg. of chlorine by the passage of 45.2 ma. (milliamperes) of current for 1 minute. Therefore if a current of 45.2 ma. chlorine is passed through the chlorine generator 12 and the chlorine thus liberated is applied to a stream of liquid flowing at 1 liter per minute, there will be an application of 1 p.p.m. of chlorine to the stream, i.e. 1 mg. per liter. A chlorine generator constructed as shown and described in the illustrated example of the apparatus (FIG. 1C) exhibits 100% efficiency for currents up to and indeed somewhat exceeding 100 milliamperes, the latter value being conveniently taken as the maximum operating level for the device. It will therefore be seen that a reliable quantitative indication of the application of chlorine to the sample stream withdrawn in the pipe 20 is provided by the amount of current passing through the cell 12.

Having completed its reaction with chlorine, i.e. to the desired point, in the chamber 50, the sample stream of water or other aqueous liquid reaches the pump reservoir 54. The function of the pump 55 is to provide feed of the liquid at a proper rate, with the aid of recirculation, to the testing cell 13, which is electrolytically responsive to the quantity of residual chlorine present.

While other types of residual chlorine-responsive cells may be employed, a convenient device is of the type substantially as disclosed in United States Patent No. 2,585,060 to Charles F. Wallace, February 12, 1952. In such a cell, the flow of solution to be tested enters from a pipe 64, is projected across a discharge chamber 65 and travels down into and around a vertical, U-shaped conduit 66 which has its downstream leg 67 arranged to open upwardly into the discharge chamber 65, from which the tested liquid leaves via a pipe 68. In the conduit leg 67 there is disposed a central elongated electrode 70 and an outer or surrounding electrode 71, appropriate electrical connection to these electrodes being made respectively by the conductors 72, 73. Although other electrode materials and arrangements may be employed, one useful form for a cell that is to yield a small current in accordance with residual chlorine in the passing liquid, involves a central positive electrode 70 of platinum and an outer negative electrode 71 of copper. Conveniently a quantity of suitable grit may be contained in the cell 13, for internal circulation through the U-tube 66—67, to clean the electrodes, the discharge chamber 65 being shaped to prevent discharge of the grit with the departing liquid.

Although in some cases, as where the sample flow through the line 20 from the main may be kept at a relatively high rate, the cell 13 can be supplied directly from the pipe 53, special advantage is served by the interposition of the circulating pump 54. The specific design of cell 13 described hereinabove is such that in a preferred structural embodiment, it requires a minimum sample flow for proper operation, requiring for best results at least about 300 ml. per minute. Since the employment of the generating cell 12 for high capacity operations, e.g. up to a residual of 10 p.p.m. or more, may involve relatively low sample flows such as 220 ml. per minute as explained above, the pump 55 serves the important function of giving the cell 13 the desired high rate of liquid flow-through, despite a lower rate of sampling. Furthermore the pump avoids any problem of sensitivity of the cell to changes of rate of sample flow, for instance if the latter is changed in order to alter the range or capacity of the dosage control system.

Although other pump structures may be employed, the effective arrangement shown includes a cylinder 75 rising vertically through the floor of the reservoir 54 and having a hollow piston 76 which receives liquid from the reservoir through an upper port 77. The piston is reciprocated by driving means comprising a connecting rod 78 pivotally connected to a drive wheel 79 which thus functions as a crank and which is actuated by suitable means such as a synchronous motor, not shown. The lower end of the piston 76 includes a check valve 80, adapted to close on the down stroke. The bottom of the cylinder 75 communicates through passage 81 and a check valve 82 (which closes when suction appears in the passage 81), to the discharge pipe 84. An overflow pipe 85 removes liquid from the top of reservoir 54 at a rate equal to its introduction at the bottom through the pipe 53.

On the suction or upward stroke of the piston 76, the check valve 80 is open and water enters the lower end of the cylinder through the port 77 and the hollow piston, the check valve 82 being now closed. On the downward, discharge stroke the valve 80 in the piston is closed so that the water is forced through the passage 81, past the now-open valve 82 into the pipe 84. The latter communicates with the inlet 64 of the cell 13 through an air bell 87, which serves to smooth the fluctuations caused by reciprocation of the pump, thereby affording essentially uniform flow through the cell. As explained, liquid return from the cell discharges into the reservoir 54 from the pipe 68.

In this way the chlorinated sample is continuously supplied to the cell 13, with recirculation as necessary in order to provide the desired rate of flow, and with continuous discharge of liquid (after test and also as excess in some cases) through the overflow 85. It will be appreciated that the recirculation of any given unit quantity of liquid through the cell 13 is sufficiently brief as to have no undesired effect on the over-all response of the demand detection system. As explained below, an appreciable time lag in the control loop is not only tolerable but desirable, for instance of the order of two minutes. Indeed it is not ordinarily contemplated that variations in demand, occurring within say a few seconds, are important, i.e. as contrasted with changes that persist over larger intervals, as of the order of minutes or longer.

The instrumentalities shown in FIG. 1C thus constitute means for withdrawing a sample of untreated liquid from the main 10 and subjecting this sample, at a constant elevated temperature, to a measured chlorination. After a constant reaction time, the sample is subjected to electrical test by the cell 13, which delivers a signal, e.g. a current that will indicate the existence and amount of residual chlorine in the liquid. As explained below, the conductors 72, 73 can be connected to suitable current measuring means for indicating, control or other operation as to the amount of residual in the sample. The volume of the reaction or retention chamber 50 is conveniently selected (as will readily be appreciated) so that together with the further time required for traversal of the associated piping, rotameter 52 and reservoir 54 the sample continuously flowing into the cell 13 has enjoyed an essentially fixed and constant reaction time following its chlorination at the injector 32. This condition is highly desirable for accuracy and reliability of results in detecting or determining the demand for chlorine treatment. A corresponding situation is seldom, if ever, attainable in systems designed to sense the effect of chlorine treatment in the main stream of liquid, i.e. after chlorination, where variable flow exists.

It will also be noted that excellent and uniform mixing of the sample is attained at the throat of the injector 32, and the temperature of the sample is effectively controlled at a convenient level by the device 11. More specifically, the temperature control afforded by that device is important in allowing the cell 13 to function without requiring compensation, e.g. manual compensation by the operator, for changes in temperature of the sample stream, which normally affect the reaction rate of the chlorine. Furthermore even apart from the absence of any need for compensation, the use of a uniform temperature in the sample stream provides a more consistent electrical response at the electrode 70. Finally, by elevating the temperature of the sample water above that of the main stream, the reaction rate for the chlorine is accelerated. Although the theoretical doubling of the rate for each 10° (C.) rise of temperature may not be experienced in practice, the effect is important because it permits obtaining reaction results in 2 or 3 minutes that might require 8 or 10 minutes, or much longer, without heating. For good control it is important to keep the lag or dead time in the control loop (described below) at a minimum. Although longer or shorter periods can be selected in some cases, the illustrated control system is designed to work with a reaction time of 2 minutes, found highly satisfactory.

While other means may be employed to complete a servo or control loop with instrumentalities such as shown in FIG. 1C, i.e. for adjustment of the chlorine generator to maintain a desired residual in the sample and thus afford a basis for control in accordance with the rate of generator operation, the arrangement of FIG. 1B is particularly effective and represents a special and further feature of invention. Here the source of current for the generating cell includes a transformer 90 which has its primary 91 connected to a conventional alternating current line and which is of a known type adapted to provide a constant voltage at its secondary 92, e.g. a voltage selected in the range of 18 to 20 volts. The secondary 92 is connected to the input terminals 93, 94 of a variable transformer 95 which may be of the autotransformer type having a moving contact 96 connected to a terminal 97.

The variable voltage output thus established at the terminals 93, 97 is supplied to a full wave rectifier 98, i.e. of conventional bridge type, which thereby delivers a pulsating direct current at its output terminals 99, 100. A filter network consisting of the choke 101 and condensers 102, 103 of conventional type, is connected to the terminals 99, 100, producing a smooth direct current in the circuit of the conductors 105, 106 leading from the filter. Conductor 106 extends through the series-connected meter 17, to become conductor 16, connected through the lead 41 to the electrode 42 of the generating cell 12, while conductor 105 similarly continues as conductor 15 to the electrode 38.

The voltage of the direct current delivered in the conductors 105, 106 is very stable, essentially unaffected by line voltage variations, and is directly adjustable by the moving contact 96 of the transformer 95. The current passed through the generating cell 12 thus depends on the adjustment of the transformer contact 96 and represents, quantitatively, an accurate measure of the rate of the chlorine application to the sample stream. As will be explained below, conductors 108, 109, from the terminals of the meter 17 may transfer a continuous signal representative of the current in the generating cell circuit, for control of the main chlorinator or feeding device in accordance with the demand of the main flow for treatment.

The conductors 72, 73, from the residual cell 13, extend to a current balancing network which may be of essentially conventional character. This network comprises a cell or battery 110 or other suitably constant source of D.C., a rheostat 111 in series with the battery, having a slider 112, and a potentiometer 113 with its end terminals connected to the slider 112 and to the conductor 114 from the other side, e.g. the negative pole, of the battery 110. Current is delivered between the slider 115 of the potentiometer 113 and the battery conductor 114, in a circuit which extends through conductors 116 and 117 (the latter including a series resistor 118), to terminals 119, 120 respectively. Terminals 119, 120 are connected to the conductors 73, 72 from the cell 13, and also to the movable winding or coil 122 of a null indicating meter 123, in series with a resistor 124, the connection of the latter to the coil being designated 125. The meter has a permanent magnet 127, so arranged with respect to the movable coil 122 that when there is effective current flow through the coil in one direction or the other, the coil and its indicating needle are correspondingly deflected to one side or the other of the null point to which these moving parts are normally biased. The resistor 124 serves to prevent impairment of sensitivity of response of the meter coil 122 as might occur because of a shorting effect by the residual cell 13 when the water from the main 10 has unusually low resistivity.

The current from the battery 110 is adjusted by the slider 112 of the resistor or rheostat 111 to a desired position, such that the location of the slider 115 on the potentiometer 113 can be calibrated in terms of p.p.m. of residual chlorine. With proper calibration, as will be readily understood, the potentiometer slider 115 may then be set to a point representative of a given chlorine residual; at such setting the current tending to flow from the battery through the meter coil 122 is exactly equal and opposite to that tending to flow through the coil from the cell 13 when the chlorinated sample exhibits the selected residual. Any deviation of the chlorinated sample from the set point of the potentiometer slider 115 will deflect the pointer and coil assembly 122 to move to the right or left, in proportion to the magnitude of departure of the detected chlorine residual from that desired. By means now to be described, this error signal across the terminals 119, 125 is utilized to correct the flow of current through the generating cell 12 so as to restore the residual in the sample to the desired point.

A magnetic structure 130 is arranged with pole pieces close to the poles of the permanent magnet 127 and has a winding 131 energized, as indicated by leads $a'$, $a'$, from a low voltage alternating current source such as the secondary terminals $a$, $a$, of a transformer 132 that is supplied from the A.C. line. The secondary 133 of this transformer delivers a constant voltage, say 3 volts. In the meter 123, the alternating field superimposed upon the permanent field of the magnet 127 is such that when the coil 122 is deflected from its central or null position a corresponding alternating voltage will be induced in the coil, viz. an alternating E.M.F. which is proportional in magnitude to the deflection and which depends in phase upon the direction of deflection, thereby translating the departure of the tested residual chlorine from standard.

The apparatus also includes a differential transformer 135 which has a primary 136, shown as consisting of two coils in series, connected, as indicated by its terminals $a''$, $a''$, to the same low voltage A.C. source, viz. transformer secondary 133, as the supplemental meter winding 131. The differential transformer also has a secondary winding 137 consisting of a pair of coils connected in series opposition. The arrangement of the primary and secondary of the transformer 135, relative to its longitudinally shiftable armature or core 138 is of a known sort, such that when the armature is in a central location, there will be no voltage developed across the terminals of the secondary winding 137. Upon displacement of the armature in one direction or the other, the voltages induced in the two secondary windings will become unequal (with the greater voltage appearing in that coil toward which the armature has been moved) so as to establish an alternating E.M.F. having magnitude and phase which depend respectively on the extent and direction of the deviation of the armature from balancing position.

The A.C. outputs of the meter coil 122 and the differential transformer secondary 137 are connected in series to the input of a suitable electronic servo amplifier 140 (of known type), in a circuit which comprises conductor 141 leading from the amplifier, coil 122, conductor 142, a blocking condenser 143 (so that no D.C. current is drawn from the meter), conductor 144, the transformer secondary 137 and conductor 145 back to the amplifier input. For adjustment of proportional band width a variable resistor 146 is shunted across the terminals of the transformer secondary 137. The resistor 146 acts as a shunt and adjustably reduces the effective voltage out of the transformer for a given displacement of the armature 138 from its null position; thus the proportional relation between error signal (explained below) and armature displacement can be adjusted.

The armature 138 has an operating rod 147 pivoted to an eccentric locality 148 of a disk 149 that is mounted, as diagrammatically indicated, on a drive shaft 150. Thus small rotative movement of the disk by its drive shaft 150 will displace the armature 138 up or down from its central position. A centering bar 151, pivoted at a remote end 152 to a stationary support (not shown) abuts a spaced pair of pins 153, 154 on the face of the disk, and has a projecting web 155 intermediate the pins and of substantially shorter extent than the space between them. The spring 156 under tension biases the bar 151 toward the pins and thus against at least one of them, and specifically against both when the assembly is in balanced position for the armature 138. By virtue of the centering bar assembly and the pins 153, 154, acting under the biasing action of the spring 156, the armature 138 will be restored to its central position, by reverse rotation of the disk 149, when any rotative force that has displaced the disk is relieved.

The amplifier 100 is designed to provide in its output conductors 158, an amplified alternating current in response to the appearance of an alternating voltage in its input leads 141, 145. Since such input voltages will only appear, during normal balance of the transformer 135, when the meter 123 registers an error, the output in the leads 158 is an amplified error signal, which is employed to adjust the transformer contact 96 (for or toward reduction of the error) and to effectuate a re-balance of the amplifier input by displacement of the armature 138.

As there is a definite but conveniently fixed and constant reaction time intermediate the chlorination of the sample and its test by the cell 13, the illustrated system is preferably arranged to make the desired correction and afford the desired re-balance, only at periodic intervals corresponding to this reaction time. Thus with a reaction time, for example, of 2 minutes or a little less, the last described operations may be performed automatically every 2 minutes.

For mechanical drive of the correcting and re-balancing devices a servo motor 160 has one winding 161, i.e. its control phase, connected to the output leads 158 from the amplifier. The other or line winding 162 of the motor is connected through conductor 164 to one side of the A.C. supply line 165, and through conductor 166, cam contacts 167 and conductor 168 to the other side of the line 165. A cam 170, continuously rotated by a synchronous motor 171, has a high spot 172 so arranged and timed that it closes the cam contacts 167 once every 2 minutes, e.g. for a short interval such as 5 seconds.

The motor 160 is arranged to drive a shaft 174 through gearing diagrammatically indicated at 175, it being understood that this gearing may be conveniently such as to provide accurate but very small displacements of the parts rotatably driven by the shaft 174. Through a slip clutch 176, the shaft 174 is connected to drive the transformer contact 96 so that by turning this contact arm the chlorine generating current is adjusted in response to the error signal. The slip clutch 176 prevents damage to the transformer, for instance, if the contact 96 for any reason should reach the end of its permitted path. The clutch likewise allows manual adjustment of contact 96 when desired. The shaft 174 also extends to the first of normally disengaged members 178, 179 of an electrically actuated clutch which has a coil or solenoid 180 that cause engagement of the clutch when energized. The other member 179 of this clutch is carried upon or otherwise arranged to turn the shaft 150 of the armature-shifting disk 149.

For actuation of the clutch 178—179, a full-wave bridge-type rectifier 181 has its input connected in parallel with the winding 162 of the motor 160, and has its D.C. output leads 183 connected to the clutch coil 180, a smoothing condenser 184 being connected across this D.C. output, to prevent chattering of the clutch. Thus during the intervals that contact 102 is closed to permit energization of the motor 160, the clutch 179—178 is actuated to provide driving connection between the power shaft 174 and the disk 149. Actual drive of the shaft 174, within each such interval, occurs only if and to the extent that an energizing signal is supplied to the winding 161 of the motor, from the amplifier 140.

The operation of the system shown in FIGS. 1B and 1C will now be understood from the foregoing. For example, if the water in the main 10 exhibits a change in demand, i.e. a change in its requirement of chlorine dosage, and if it is assumed that the generating cell 12 has been operating to provide the desired residual chlorine content (after reaction), such change in character of the water will cause a departure of the current output of the cell 13 from a value equal to the balancing current normally supplied to the meter coil 122 by the instrumentalities 110, 111, 113. The meter coil 122 therefore exhibits a deflection (from its null position) representing the magnitude and direction of the departure of residual chlorine from the desired value in the treated sample. The A.C. input to the amplifier 140 is thus unbalanced by a corresponding error signal inducted by the device 130—131.

When the cam 170 next closes the contacts 167, the clutch 178, 179 is engaged and the motor 160 is energized to drive both the disk 149 and the transformer contact 96 simultaneously. The disk 149 is thus turned to displace the armature 138, causing the output of the differential transformer secondary 137 to balance the A.C. signal from the coil 122. This action takes place promptly, eliminating the error signal at the input of the amplifier 140 and therefore causing the motor 160 to stop. During its rotation, however, the motor has also effected a corresponding extent of adjustment of the contact 96, increasing or decreasing the current flow through the generating cell 12.

It will readily be understood that the design and values of the various components, and particularly the setting of the band adjusting resistor 146, are such that at least in most cases, this step of adjustment of the generating current will be appropriate for restoring the chlorine residual to the desired value, such restoration occurring during the next 2 minutes of inactivity of the balancing means. In any event, if the adjustment of the chlorine generating current has been insufficient or has exceeded the requirement, the next cycle of adjustment (upon the next interval of closure of contacts 167) will provide further correction.

As explained, the adjustments of armature 138 and of the transformer contact 96 occur within the interval of closure of the contacts 167. At the end of this interval, the clutch 178, 179 is deenergized permitting the armature 138 to be restored by the spring 156, to its central or null position. Although at that instant the correction of the chlorine generating current will not yet have resulted in restoring the meter coil 122 from its deflected position, the motor 160 cannot operate because its line phase winding 162 has also now been deenergized. When the next correction cycle occurs, i.e. 2 minutes later, the above described operations will be repeated if need for correction still or again exists. If at this or other times the reading of the cell 13 indicates the desired residual, no error signal is established in the input of the amplifier 140 and no correction occurs during the time of closure of the contacts 167.

The electromagnetic clutch 178—179 is preferably of a type which will slip if rotation of the shaft 150 is impeded, as for example may occur when in any cycle the error signal is unusually large and pin 153 or pin 154 strikes the web 155 before the contacts 167 open.

It will now be seen that the system affords continuous chlorination of the sample stream at a measured and adjusted rate, with continuous detection of the residual chlorine characteristics after a constant reaction time and under constant conditions, while the re-balancing instrumentalities provide automatic adjustment to keep the rate of chlorination at a value exactly corresponding to the demand of the water or other liquid in the main. Since the measured rate of chlorine application to the samlple thus represents an accurate measure of demand, a signal indicating this value, e.g. the current reading through the meter 17, is conveniently utilized for control of principal treatment, e.g. chlorination, of the flow in the main 10.

In normal operation for correction of the chlorine generator operation in response to changes in detected residual, the drive of the shafts 174 and 150 is such that the correcting action is almost instantaneous and ordinarily well within the brief interval of closure of the contacts 167. At times a rather large correction step may be necessary, as in starting up the system or by reason of an abnormally large change in the demand of the water. In such cases, the arrangement may function stepwise, e.g. by making progressive corrections each 2 minutes until the desired operating point is reached. Conviently, the proportional band width provided by adjustment of the variable resistor 146 may be set so that the maximum possible correction in a single cycle (i.e. within the closure interval of contacts 167) is equal to that required to reach the desired residual point from a condition where the chlorination has been just barely insufficient to provide a detectable content of residual chlorine. Any appreciably larger extent of adjustment of the contact 96 (in a single cycle) is then prevented by the opening of contacts 167, arresting the motor. Furthermore, mechanical adjustment of the armature 138 is additionally and separately limited by the web 155 on the centering bar 151. Hence if the deflection of meter coil 122 has not been balanced when the balancing system reaches the limit of one step, there can be further correction in one or more succeeding cycles.

Although condition-detecting cells of different kind and greater range may be used in special cases, the illustrated type of cell 13 is quantitatively blind, so to speak, for water conditions of zero residual, i.e. where chlorination has been lacking or is insufficient to produce a residual content. Hence at times when the chlorine application by the cell 12 is far less than sufficient to produce a residual, the controller will proceed to adjust the cell 12 by successive increments of the amount described above, until a residual actually appears, whereupon the next correction, if it is necessary, will be proportioned only to the actual departure below the desired residual chlorine point. Although progressive stepwise correction can be relied upon to bring the equipment to the desired operating point in starting up, it may alternatively be desirable to provide an initial manual setting of the contact 96, for example near but below the expected value of chlorine-generating current.

As is known in other use of cells of the type shown at 13, supplemental reagent material may be supplied to the circulating flow of liquid sample, if desired. For instance, suitable buffer solution may aid in maintaining reproducibility of the cell results under varying conditions of the water, and it may also be desirable to add an iodide, such as potassium iodide in solution, so that the cell will respond rapidly to chloramines as well as to free chlorine (e.g. chlorine in the form of hypochlorous acid). Although when iodide is supplied the immediate response of the cell is understood to be directed to the detection of available iodine released by reaction with chlorine and chloramines, the function is essentially that of measuring active chlorine content. Indeed unless otherwise stated, references herein to detection of residual chlorine will be understood to embrace such detection with or without the aid of supplemental reagents and to comprehend the detection of chlorine either in the form of active chlorine itself or in the form of both active chlorine and chloramines. For addition of such supplemental reagent solutions, a small, substantially constant flow of same may be introduced to the path of liquid in the cell 13 as by a pump 186 delivering the solution through pipe 187 and nozzle 188.

A complete control system according to the invention, including means for adjusting the principal treatment in accordance with demand as determined by the apparatus of FIGS. 1B and 1C, may include any of a variety of means responsive to demand-indicating signals. Purely by way of illustration, FIG. 1A shows a diagram of apparatus for adjusting the dosage or chlorine flow control element 20 of a full-capacity chlorinator 18, which may be of conventional type, receiving chlorine gas through pipe 201 from a suitable source and delivering chlorine solution through pipe 202 to the downstream portion 10a of the main.

The electrical signal (of chlorine demand) conducted by the wires 108, 109 may consist of essentially a voltage signal across the meter 17, or a very minor fraction of the current flow, i.e. a signal proportional to the current in the circuit of the chlorine-generating cell but such as not to impair the significance of that current as measuring the demand of the water in the main 10 for treatment. By way of example, this signal may be received by the movable coil 204 of a meter 205 similar to the meter 123 and having a permanent magnet 206 as well as a supplemental magnetic core structure 207 with a winding 208 to be energized by low voltage alternating current as in the case of winding 131. For calibration or setting purposes and for limitation of current flow, an adjustable resistor 210 may be included in the circuit to the meter 17, e.g. in the conductor 109.

The terminals of the meter coil 204 are connected in a series circuit 214 with the secondary 211 of a differential transformer 212 having its primary 213 energized from the same low voltage alternating current source as the winding 208. Conveniently this source may be the secondary 133 (terminals $a$, $a$) of the transformer 132, as indicated by the designations $a^3$ and $a^4$ for the terminals respectively of the windings 208 and 213. The series circuit 214 just described, including a blocking condenser 215, extends to the input of a suitable servo amplifier 216, e.g. like the amplifier 140. The A.C. output of this amplifier is connected to energize the phase winding 218 of a servo motor 219 having its other or line phase winding 220 connected to the conventional, e.g. 115 volt A.C. line, being the same A.C. line as employed for energization of the primary of transformer 132 and for the supply circuit to the winding 162 of the motor 160. As explained below, this motor 219 is employed to adjust the control element 200 of the chlorinator 18, and also to move the armature 222 of the differential transformer 212, for re-balancing of the input circuit 214.

Means may also be provided for adjusting the chlorinator 18 in accordance with changes of flow in the main 10. To that end, a suitable flow-responsive device is employed, such as a venturi meter or other means converting flow changes into corrective displacements or signals, any of a variety of such known devices being generally suitable. Thus diagrammatically there is illustrated a venturi 224 in the main 10 and a translating or converting device 225 responsive to changes in the pressure drop between the entrance and throat of the venturi, for positioning a lever arm 226 in accordance with variations of water flow.

Various mechanical, electrical or other means may be used to effectuate the control of the chlorinator 18 in accordance with demand and flow. Purely by way of schematic example, the motor 219 is shown driving a pinion 228 which positions a rack 229 that is connected to the armature 222 and that also carries a movable fulcrum 230 for a lever 231. One end 232 of the lever is linked to the flow-controlling arm 226 while the other end 233 adjusts the control element 200 of the chlorinator through suitable mechanism such as linkage and gearing shown at 235. It will be seen that displacements of the end 232 of the lever in accordance with flow changes cause corresponding displacements of the other end 233 and thus of the chlorinator control 200. Likewise with the lever so circumstanced that throughout its range of operation it is always at an acute angle to the path of the rack 229, adjustments of the fulcrum 230 function in effect to rock the lever about the end 232 as a fulcrum, and thereby to adjust the control mechanism 235 and the element 200 of the chlorinator. As will be understood, the connections are such that upon increase in demand or increase of flow, the element 200 is turned to a higher setting of chlorine feed, and vice versa.

In operation, with the chlorinator 18 functioning to supply chlorine at a desired rate, the signal in the conductors 108, 109, will maintain the meter coil 205 in a corresponding position of deflection. The resulting A.C. signal in the circuit 214 will have been balanced by an opposite A.C. signal across the transformer secondary 211, i.e. by proper positioning of the armature 222. With the flow control 225 functioning as desired, the position of the lever 231 as determined by such control and by the rack 229 will have adjusted the chlorinator for feed of chlorine in accordance with flow and in proportion to the sample chlorinator feed which is indicated at the meter 205 and which measures the demand.

If the rate of flow in the main changes, the control arm 226 shifts the lever 221, as explained above and adjusts the chlorinator accordingly. If the demand for treatment changes, i.e. as detected upstream in the main by the instrumentalities in FIGS. 1B and 1C, the meter 205 exhibits a proportional change in the deflection of its coil 204, correspondingly changing the alternating current output and unbalancing the input circuit of the amplifier. With current thus supplied to the phase winding 218 of the motor 219, the rack 229 is moved to adjust the armature 222, in a direction to change the output of secondary 211 for re-balancing the input circuit. At the same time, the movement of the fulcrum causes adjustment of chlorinator control 200 in a direction and extent to meet the change of demand. With the circuit 214 restored to balance, reducing the amplifier input signal to zero, the energization of motor winding 218 is interrupted and the motor stops, with the several elements in their adjusted positions. In this fashion, automatic control of the chlorinator is effectuated, according to predetermined demand and likewise according to flow changes.

Although the chlorinator-controlling devices are capable of embodiment in other forms and although, in particular, the system of FIGS. 1B and 1C is specially suitable for association with chlorinating means and adjusting devices therefor as disclosed in the copending patent application of Charles F. Wallace and John O. Kirwan, Serial No. 647,652, filed March 21, 1957, now Patent No. 2,929,393 (reference to said application thereby in effect representing a disclosure of other forms of the present invention), the principles of the complete combination are believed to be illustrated with clarifying simplicity, and sufficiently, by the apparatus schematically shown in FIG. 1A.

The several elements and combinations of the invention have now been explained as achieving the desired objects. The means establishing the demand signal attain accurate and reproducible results. The arrangement for periodic null-balance error correction is specially useful where there must be a reaction time lag in the treatment of the liquid sample, and is accomplished by novel means of rapid and reliable character. Although the actual error correction (in the sample) occurs only at intervals, the electrical control means for such correction are continuously maintained in a condition directly responsive to the residual chlorine content established in the sample stream. While other chlorine supply means may be used, the electrolytic generator 12 is accurate and essentially rugged while providing an immediate electrical reading that is readily translated for indication or recording (as at the meter 17) or for control purposes. The advantages of establishing a controlled, elevated temperature and a constant, short reaction time in the flowing test sample have been explained. The system also provides optimum coordination among the required reaction time (i.e. the time needed for the chlorine to function in the water), the storage or retention time actually afforded in the sample flow line, and the dwell time or interval between successive error corrections in the demand-detecting means. Finally, the complete combination is specially useful in providing chlorinator control in accordance with actual demand of the aqueous liquid for treatment, without dependence on measurement of the liquid in the main itself at some time after the principal treatment.

One particularly effective mode of correlating the demand-responsive means of FIGS. 1B and 1C with the chlorinator of FIG. 1A is to provide mutual location of the sampling pipe 20 and the main chlorine supply pipe 202 such that the adjustment of the chlorinator in response to detected changes in demand causes modification of the amount of chlorine delivered from the pipe 202 at just about the time that water with the modified demand characteristic is reaching the locality of pipe 202, i.e. in its travel along the main from the point where the sample was withdrawn. It will be appreciated, however, that achievement of precise timing of this sort is not necessary in all cases. Indeed for many purposes safe and effective results are attainable where the mutual timing of the sampling and chlorine supply operations may depart considerably from the theoretical optimum, since the set point of residual chlorine will ordinarily permit some tolerance with respect to short-term variations in the relation between actual chlorine feed at 202 and the demand of the water in the main for chlorination. Hence for these and other reasons as explained above, a particular advantage of the invention is that it may avoid necessity for accurate spacing of sampling and chlorine feed localities such as is necessary for control systems responsive to residual chlorine in the principal stream of water and such as is very difficult to obtain in practical installations.

It is to be understood that the invention is not limited to the specific apparatus and operations herein described and shown but may be carried out in other ways without departure from its spirit.

I claim:

1. In a system for the treatment with chlorine of a main flow of unchlorinated aqueous liquid, in combination, means comprising a main vessel for said main flow, for advancing said unchlorinated liquid along said vessel in a predetermined direction past a first locality of the vessel to a second locality thereof downstream of the first locality, adjustable means connected to said vessel at the second locality for there supplying chlorine to said main flow, and means connected to said vessel at the first locality, for determining in advance the demand of the unchlorinated liquid for treatment with chlorine to reach a desired standard result of such treatment, said demand-determining means comprising conduit means for withdrawing a sample flow of said unchlorinated liquid, at a controlled rate, from said vessel at said first locality, electrolytic chlorine generating means connected to said conduit means for chlorinating said sample flow at a rate governed by supply of current to said generating means, adjustable current supply means having a circuit extending to said chlorine generating means for energizing the latter, means associated with the conduit means downstream of the sample chlorinating means for testing the sample flow of liquid after chlorination, to produce an electrical signal variable with the chlorine content of the treated liquid, standard means for producing, independently of the character of the liquid, a constant, comparable electrical signal representing the aforesaid desired standard result of chlorine treatment, and cyclically operating means electrically directly responsive to departures of the first signal from the second signal as representing departure of the chlorine content of the treated liquid from the desired standard result of treatment, for periodically adjusting said current supply means to change the rate of chlorination by the generating means in a direction to restore the chlorine content of the treated liquid to the desired standard result.

2. Apparatus as defined in claim 1, which includes means associated with the current supply circuit and controlled in accordance with the current therein to the electrolytic chlorine generating means, for producing a signal representing the demand of the unchlorinated liquid for chlorine treatment to reach said standard result.

3. Apparatus as defined in claim 1, which includes thermostatically controlled means associated with the conduit means at a region thereof between the main vessel and the electrolytic chlorine generating means, for heating the sample flow of liquid in the conduit means to a predetermined temperature to provide a substantially constant condition of temperature in said sample flow for chlorine reaction.

4. Apparatus as defined in claim 1, which includes means controlled in accordance with current in the supply circuit to the electrolytic chlorine generating means, for adjusting the chlorine-supplying means at the second locality on the main vessel, to provide chlorination of the main flow in accordance with the demand of the liquid for chlorine treatment to reach said standard result.

5. Apparatus as defined in claim 4, which includes thermostatically controlled means associated with the conduit means at a region thereof between the main vessel and the electrolytic chlorine generating means, for heating the sample flow of liquid in the conduit means to a predetermined temperature to provide a substantially constant condition of temperature in said sample flow for chlorine reaction, and wherein the conduit means intermediate the electrolytic chlorine generating means and the testing means includes liquid-handling means delaying the passage of liquid for a predetermined reaction time, said cyclically operating means having driving means therefor to effect the periodic adjustments of the current supply means only between intervals each at least about equal to said reaction time.

6. Procedure for controlling the treatment with chlorine of a main flow of unchlorinated aqueous liquid, comprising advancing said main flow of unchlorinated liquid along a predetermined path past a first locality of said path to a second locality thereof spaced downstream of the first locality, supplying chlorine to said main flow at the second locality, withdrawing a sample flow of said unchlorinated liquid from said main flow at the first locality at a controlled rate, electrolytically generating chlorine by the action of electric current and feeding said chlorine to the sample flow at a rate governed by the said current, sensing the sample flow after its said treatment with chlorine to produce an electrical signal variable with the chlorine content of said treated sample liquid, establishing a constant, comparable electrical signal, independently of the character of the liquid, as representative of a desired standard result of chlorine treatment of the unchlorinated liquid, directly comparing said variable signal and said constant signal to detect differences of electrical value between them, and adjusting the supply of current for said electrolytic chlorine generation, at intervals when necessary in direct response to detected differences between said signals, so as to change the rate of feed of chlorine to the sample flow in a direction for restoration of the chlorine content of the treated sample to the standard result from which departure has been indicated by difference of said signals, and controlling the supply of chlorine to the main flow at the second locality in accordance with the supply of current for said electrolytic chlorine generation, to provide chlorine dosage of the main flow in correspondence with the sample dosage required for the standard result.

7. Procedure as defined in claim 6, which includes heating the sample flow, prior to the feed of chlorine thereto, to a predetermined constant temperature substantially higher than the temperature of the flow as withdrawn from the main flow, to provide a substantially uniform temperature condition for chlorine reaction and a chlorine reaction time substantially shorter than is characteristic of the sample flow as withdrawn.

References Cited in the file of this patent

UNITED STATES PATENTS

| | | |
|---|---|---|
| 1,944,804 | Ornstein | Jan. 23, 1934 |
| 2,370,871 | Marks | Mar. 6, 1945 |
| 2,396,934 | Wallace | Mar. 19, 1946 |
| 2,585,060 | Wallace | Feb. 12, 1952 |
| 2,585,811 | Marks | Feb. 12, 1952 |
| 2,607,718 | Suthard | May 19, 1952 |
| 2,621,671 | Eckfeldt | Dec. 16, 1952 |
| 2,758,079 | Eckfeldt | Aug. 7, 1956 |
| 2,782,151 | Suthard | Feb. 19, 1957 |